(12) United States Patent
Liao

(10) Patent No.: US 6,364,327 B1
(45) Date of Patent: Apr. 2, 2002

(54) LOWER SUPPORTER FOR A GOLF CART

(76) Inventor: Gordon Liao, No. 5, Alley 54, Lane 737, Chung Jeng North Road, Yung Kang City, Tainan Hsien (TW)

( * ) Notice: Subject to any disclaimer, the term of this patent is extended or adjusted under 35 U.S.C. 154(b) by 0 days.

(21) Appl. No.: 09/757,236

(22) Filed: Jan. 8, 2001

(51) Int. Cl.⁷ .................................................. B62B 1/04
(52) U.S. Cl. ........................ 280/40; 248/96; 280/646; 280/DIG. 6
(58) Field of Search ....................... 280/40, 646, 47.24, 280/47.26, 655, DIG. 6, 651, 652; 248/96

(56) References Cited

U.S. PATENT DOCUMENTS

| | | | | |
|---|---|---|---|---|
| 4,946,186 A | * | 8/1990 | Cheng | 280/646 |
| 5,180,184 A | * | 1/1993 | Chiu | 280/DIG. 6 |
| 5,201,540 A | * | 4/1993 | Wu | 280/646 |
| 5,281,044 A | * | 1/1994 | Chen | 280/DIG. 6 |
| 5,451,072 A | * | 9/1995 | Weng | 280/646 |

* cited by examiner

Primary Examiner—Michael Mar
(74) Attorney, Agent, or Firm—Pro-Techtor International Services

(57) ABSTRACT

A lower supporter for a golf cart includes an upper support base and a lower support base. The upper support base is curved and has two opposite ends pivotally connected to a projecting block, and a pivot opening formed in an intermediate portion. The lower support base is located under the upper support base, and has a pivot opening corresponding to the pivot opening of the upper support base. A pair of pivot arms are provided outside of the two pivot openings, and pivotally connected with the upper and the lower support base. A straight frame rod has a lower end that fits in the pivot openings of both the upper and the lower support base to separate the upper support base from the lower support base to allow the bottom of a golf club bag to rest on the lower support base, with a side bag of the golf club bag resting on the projecting blocks pivotally connected to the upper support base.

1 Claim, 11 Drawing Sheets

LOWER SUPPORTER FOR A GOLF CART

BACKGROUND OF THE INVENTION

This invention relates to a lower supporter for a golf cart, particularly to one minimizing its dimensions after collapsed to reduce transporting cost, and convenient to handle in spreading and collapsing the golf cart.

A known conventional golf cart shown in FIG. 1 includes a frame rod 1, an upper supporter 11 fixed on an upper end of the frame rod 1 and a lower supporter 12 fixed on a lower end of the frame rod 1 for supporting a golf club bag 3 between them, as shown in FIG. 2. Further, the frame rod 1 has a curved sustaining member 10 formed in a lower portion for sustaining a side bag 30 of the golf club bag 3, and the sustaining member 10 effectively sustains the side bag 30 as shown in FIG. 3.

But the sustaining member 10 together with the frame rod 1 and the lower supporter 12 protrudes 88.5 mm out of the wheels, increasing the dimensions of the collapsed golf cart.

SUMMARY OF THE INVENTION

The objective of the invention is offer a lower supporter for a golf cart collapsible to a minimized dimensions so as to reducing transporting cost and thus elevating market competition.

BRIEF DECRIPTION OF DRAWINGS

This invention will be better understood by referring to the accompanying drawings, wherein.

DETAILED DESCRIPTION OF THE PREFERRED EMBODIMENT

Figure 6:
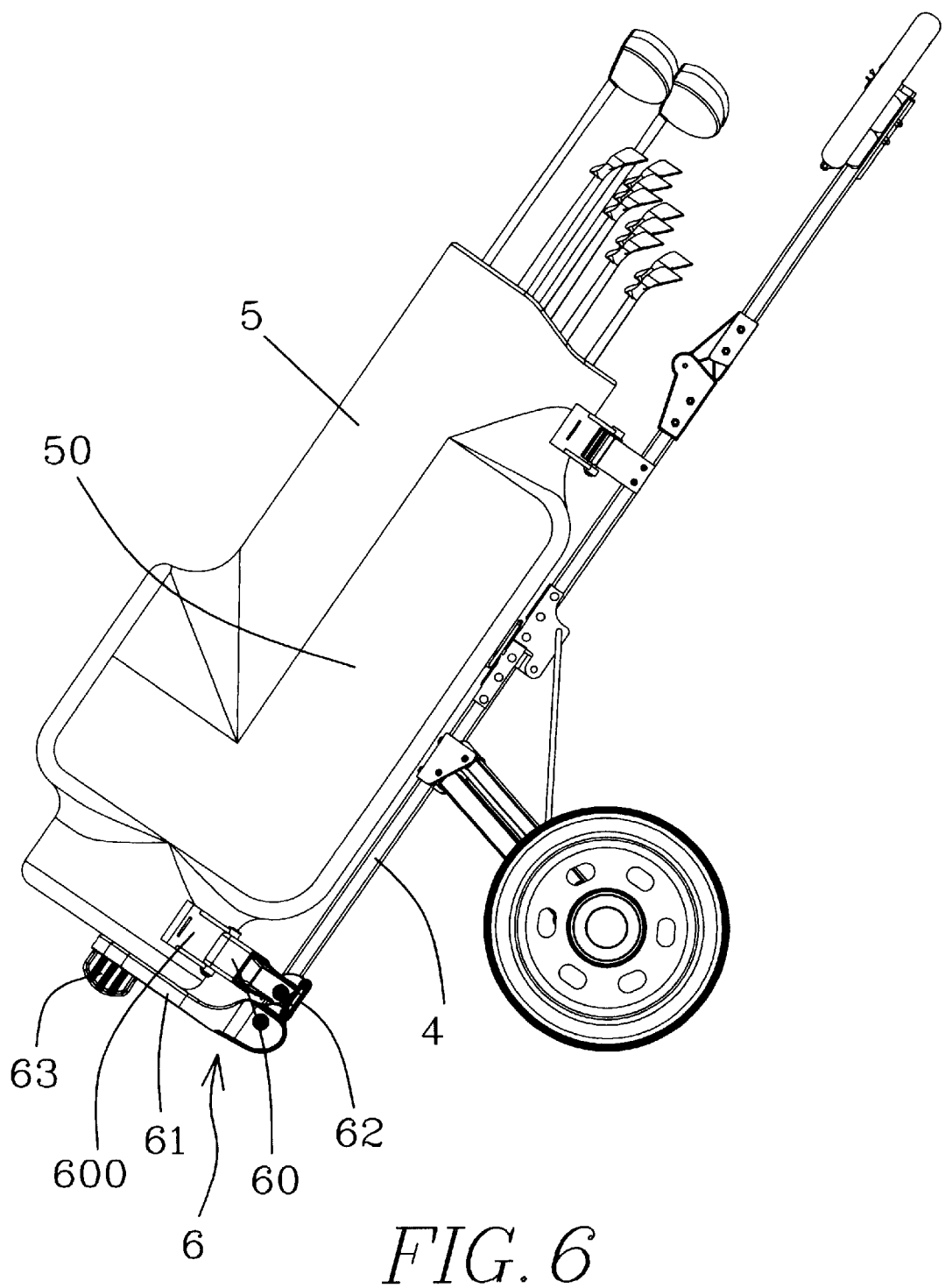
FIG. 6 is a side view of a lower supporter for a golf cart supporting a golf club bag in the present invention.

A preferred embodiment of a lower supporter for a golf cart in the present invention, as shown in FIG. 6, includes a straight frame rod 4 with no curved sustaining member 10 formed in a conventional frame rod, and a lower supporter 6 improved to support a golf club bag 5 and consisting of an upper support base 60 and a lower support base 61 combined together.

Figure 7:
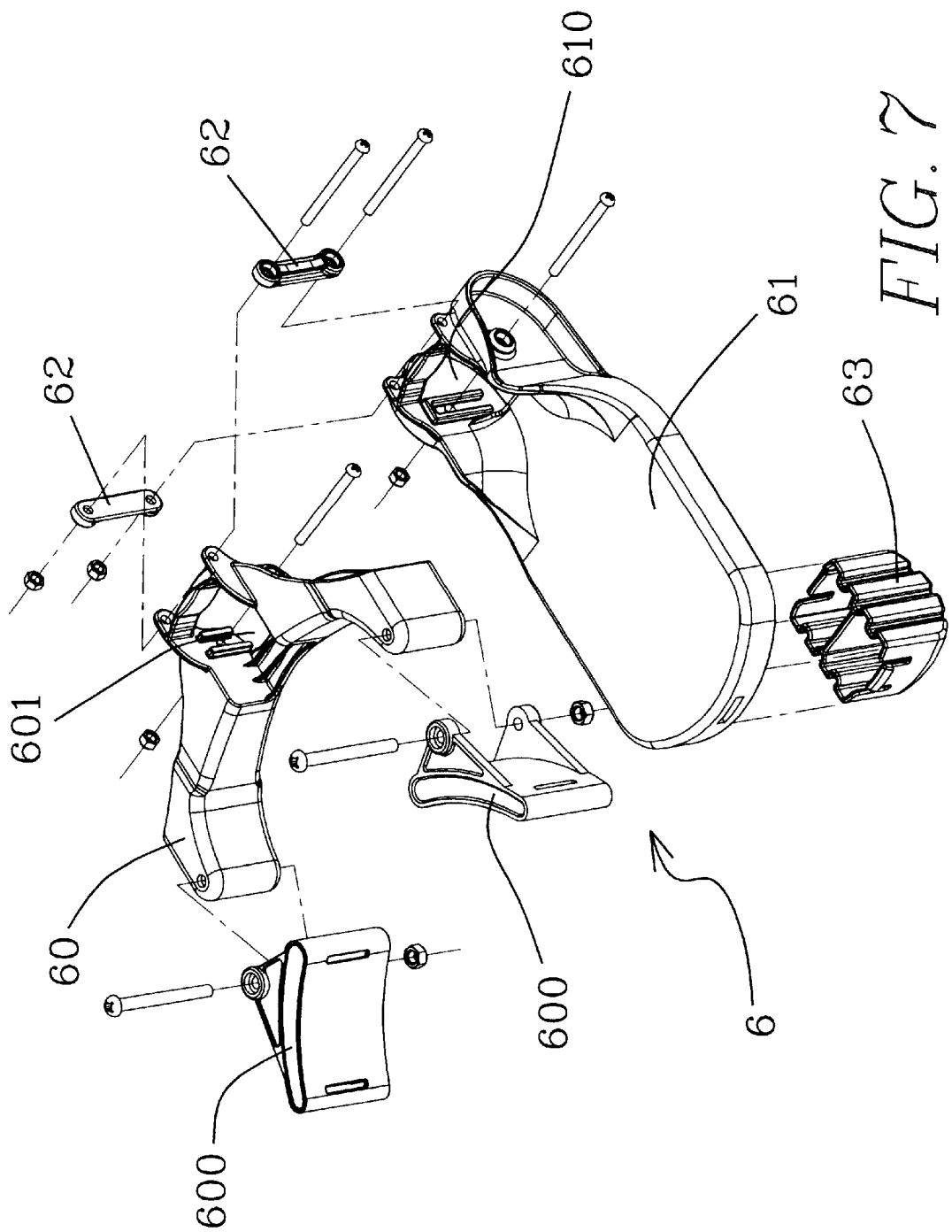
FIG. 7 is an exploded perspective view of the lower supporter for a golf cart in the present invention.

The upper support base 60, as shown in FIG. 7, is shaped as curved, having a pivot hole formed in two opposite ends to pivotally connecting a projecting block 600, and a pivot opening 601 formed in an in termediate portion.

Figure 8:
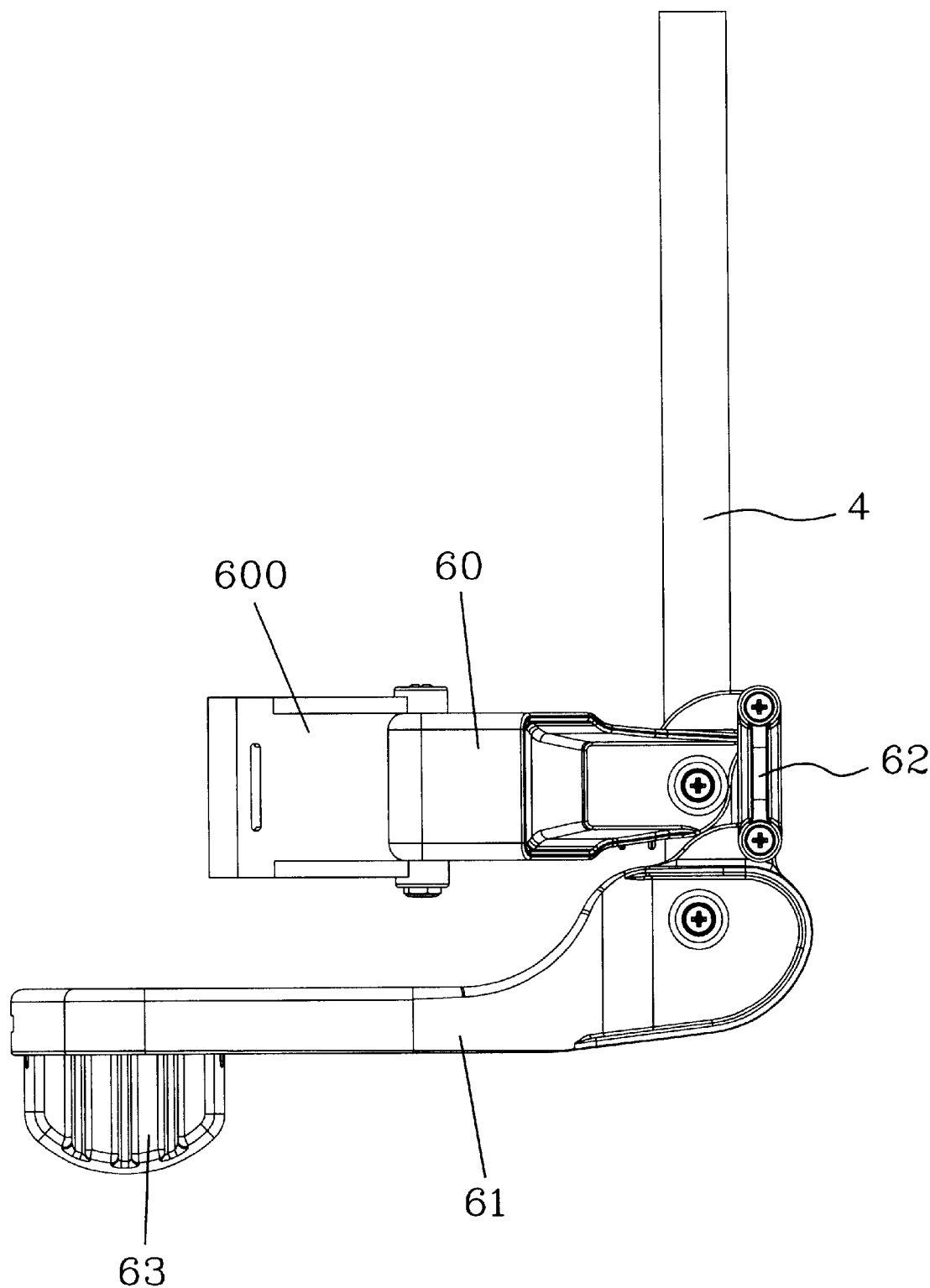
FIG. 8 is a side view of the lower supporter for a golf cart in the present invention.
Figure 9:
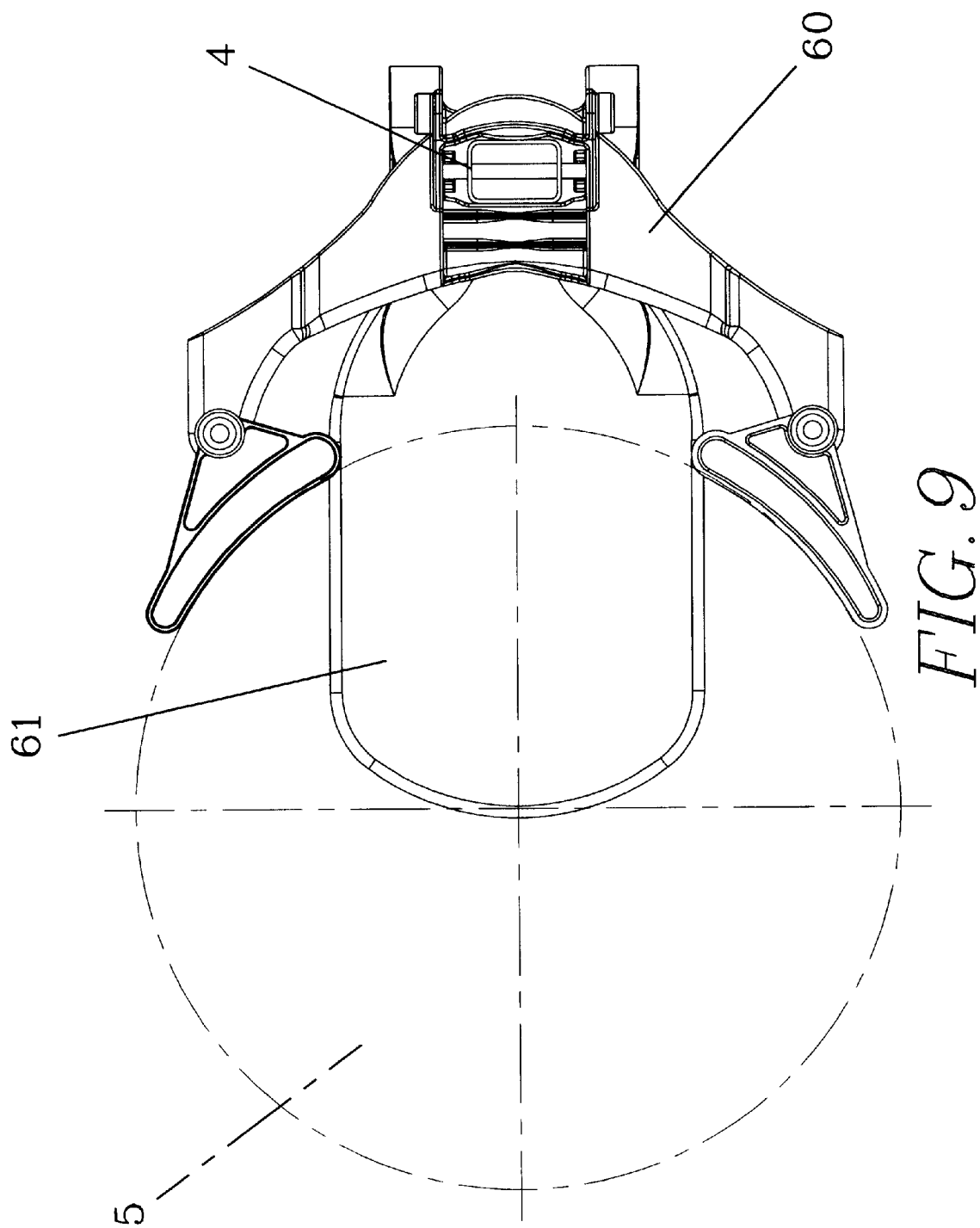
FIG. 9 is an upper view of the lower supporter supporting a golf club bag in the present invention.

The lower support base 61 is located under the upper support base 60, having a pivot opening 610 corresponding to the pivot opening 601 of the upper support base 60, outer sides of the two pivot openings 601 and 610 pivotally connected with a pare of pivot arms 62 so as to move together the upper and the lower support base 60 and 61. The lower end of the frame rod 4 extends in the two pivot openings 601, 610 as shown in FIG. 8, letting the upper support base 60 separate from the lower support base 61 so that the side bag 50 of the golf club bag 5 may have its bottom directly rest on the projecting block 600, as shown in FIG. 6. On the contrary, if the golf cart is not to be used and to be collapsed, fold the upper support base 60 and the lower support base 61 against the frame rod 4 to become the minimized dimensions.

Figure 1:
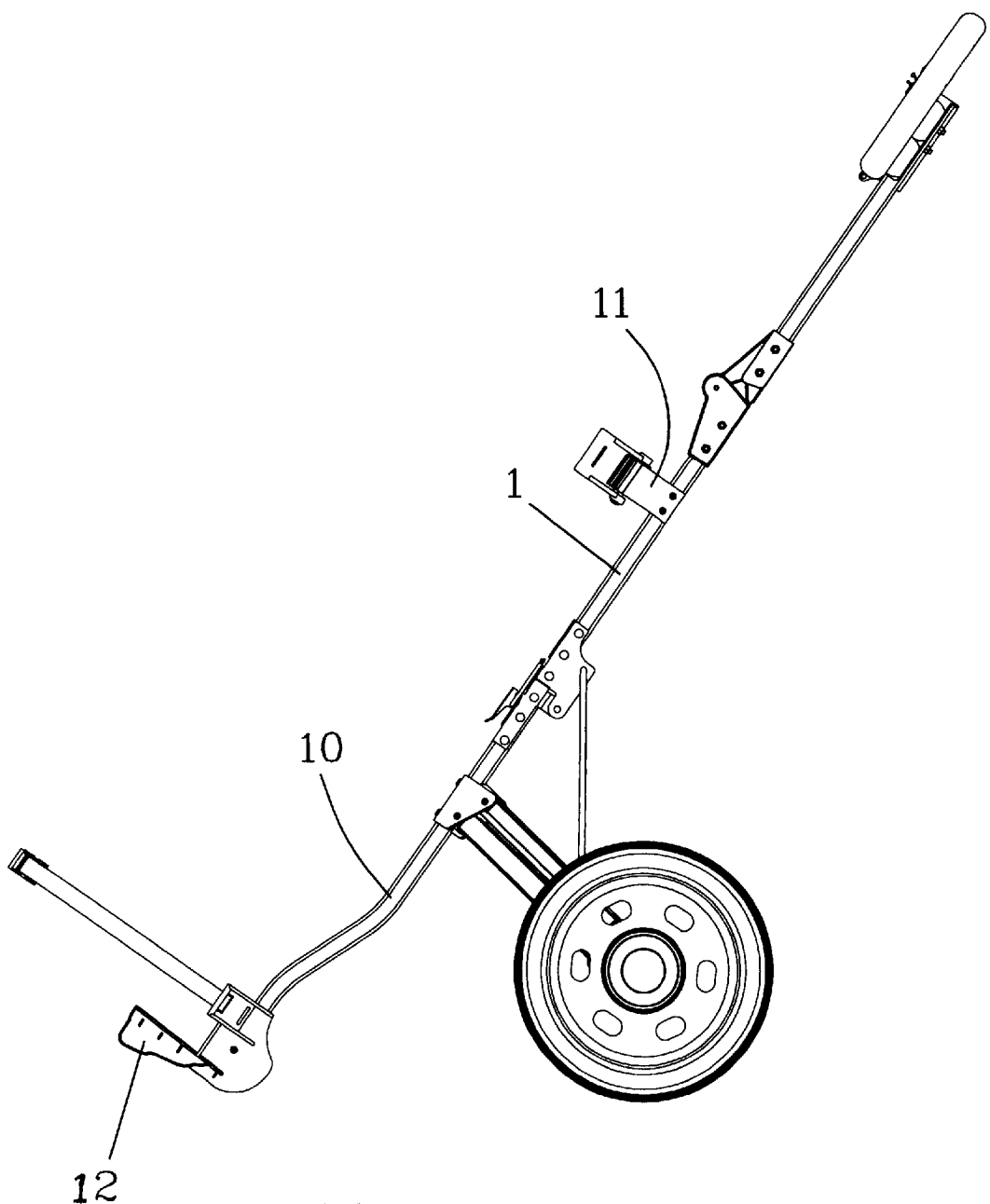
FIG. 1 is a side perspective view of a known conventional golf cart.
Figure 2:
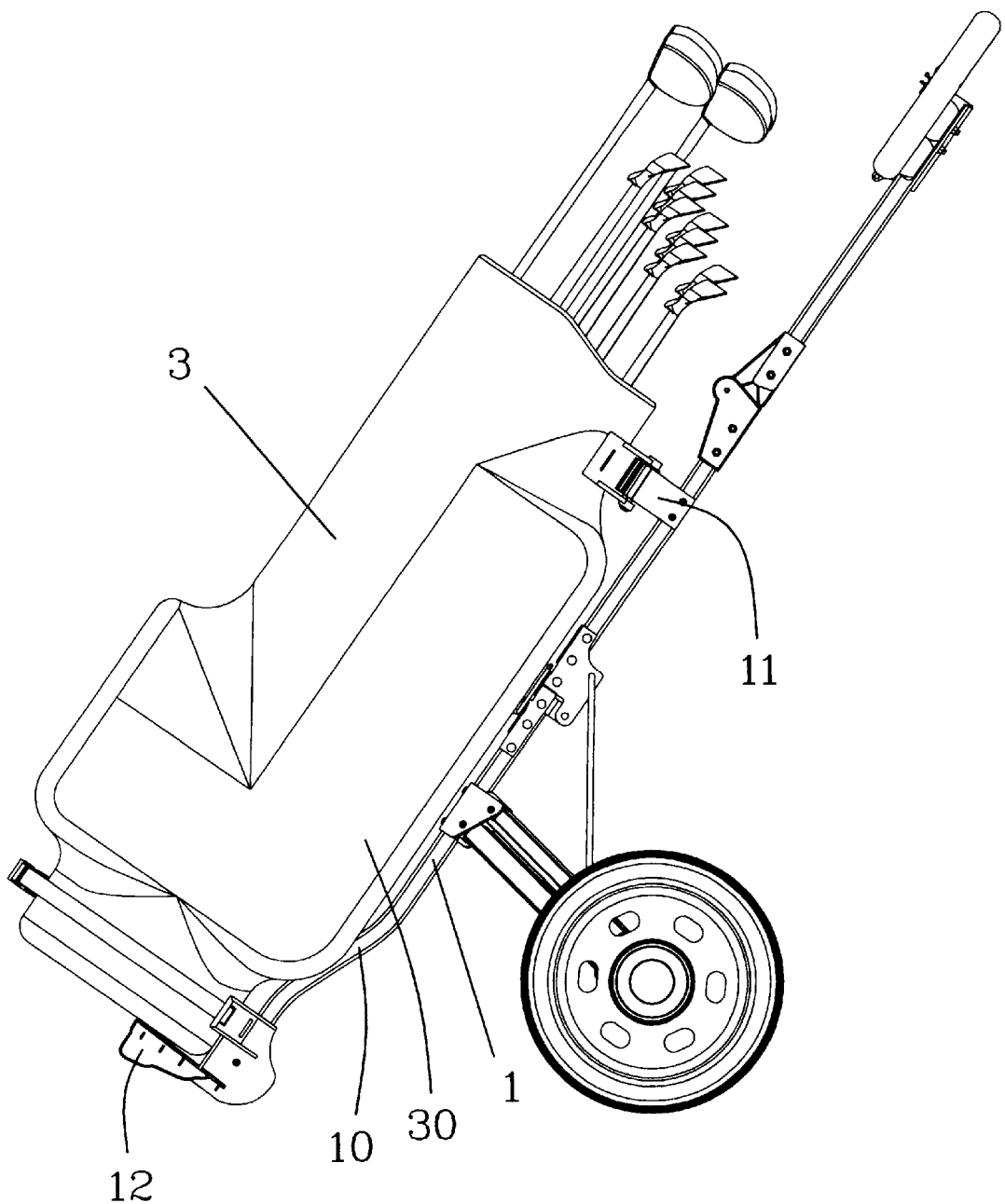
FIG. 2 is a side perspective view of the known conventional golf cart carrying a golf club bag.
Figure 3:
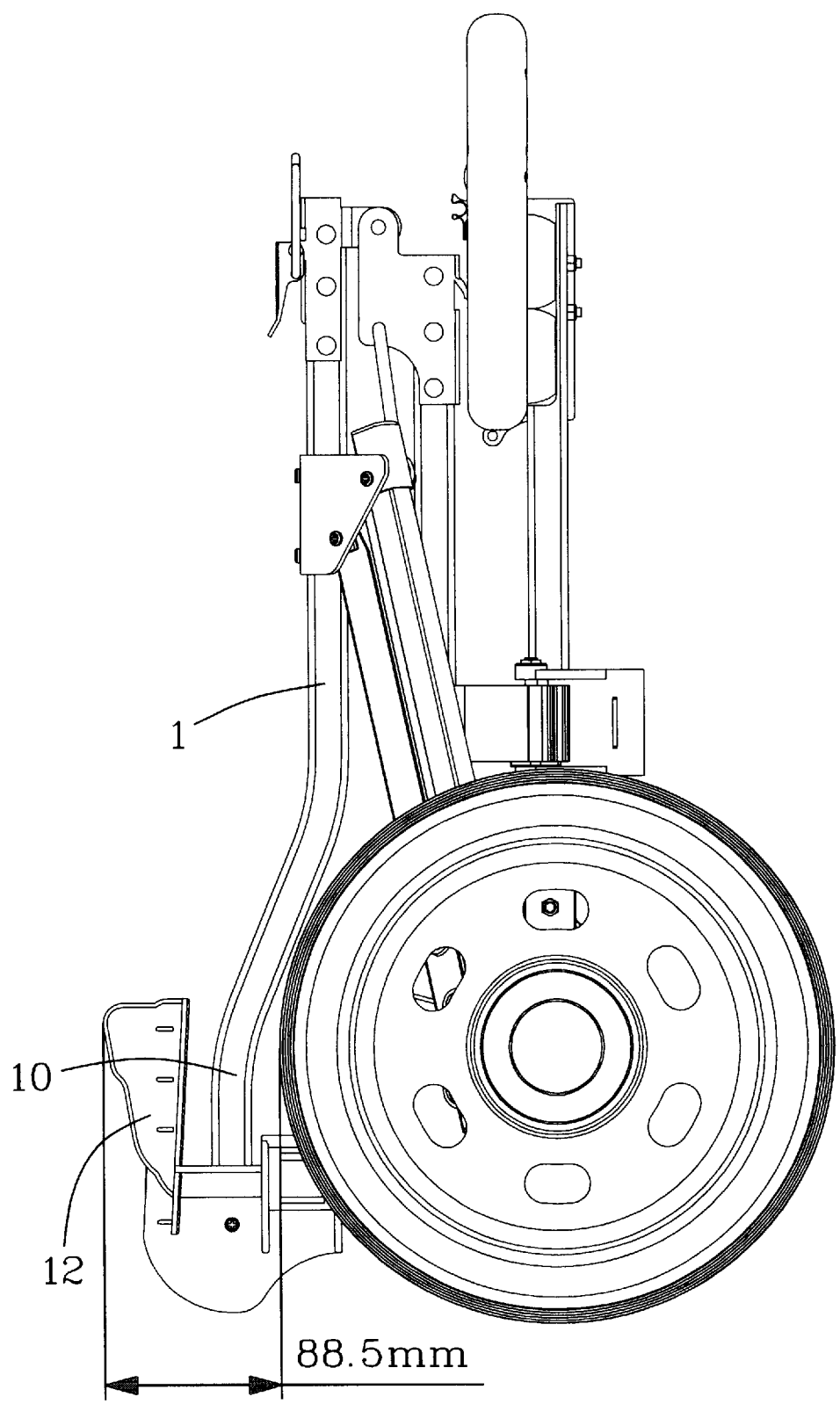
FIG. 3 is a side view of the known conventional golf cart in a collapsed condition.
Figure 11:
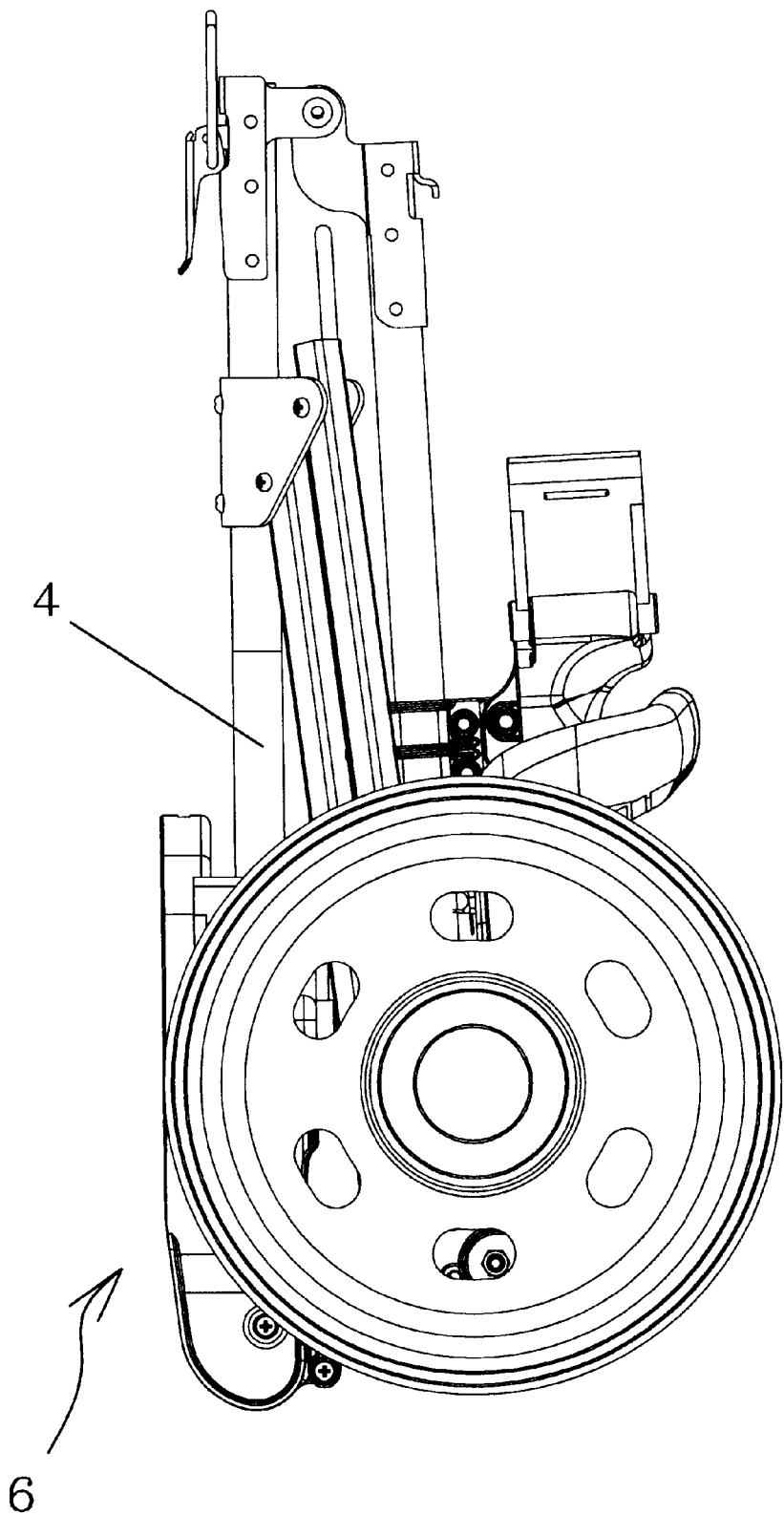

In addition, a case-shaped bottom base 63 is provided to fit under an outer end of the lower support base 61 to rest on the ground to support the golf cart stably in use, and removed from the lower support base 61 in case of not using the golf cart. FIG. 11 shows the golf cart with the lower supporter in the invention having minimized dimensions, with the frame rod 4 and the lower supporter 6 not a bit protruding outward of the wheels. In case comparing FIG. 3 with FIG. 1, it is quite evident that the collapsed golf cart in the invention has far less dimensions than the conventional golf cart collapsed.

Figure 4:
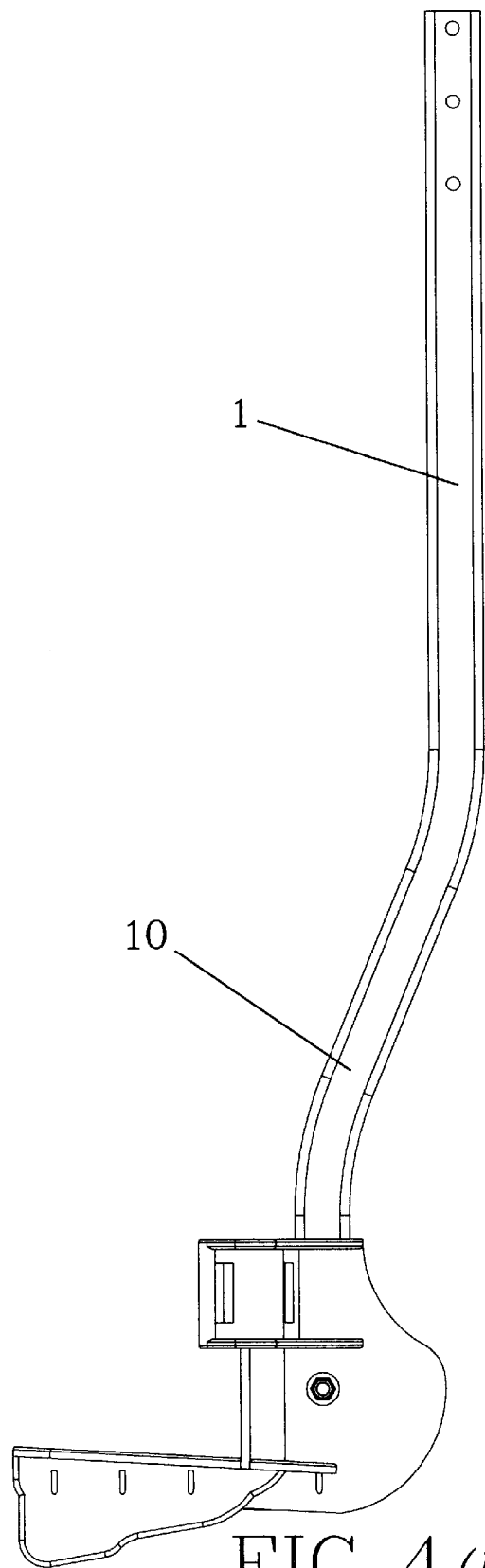
FIG. 4 is a side view of a frame rod of the known conventional golf cart.
Figure 5:
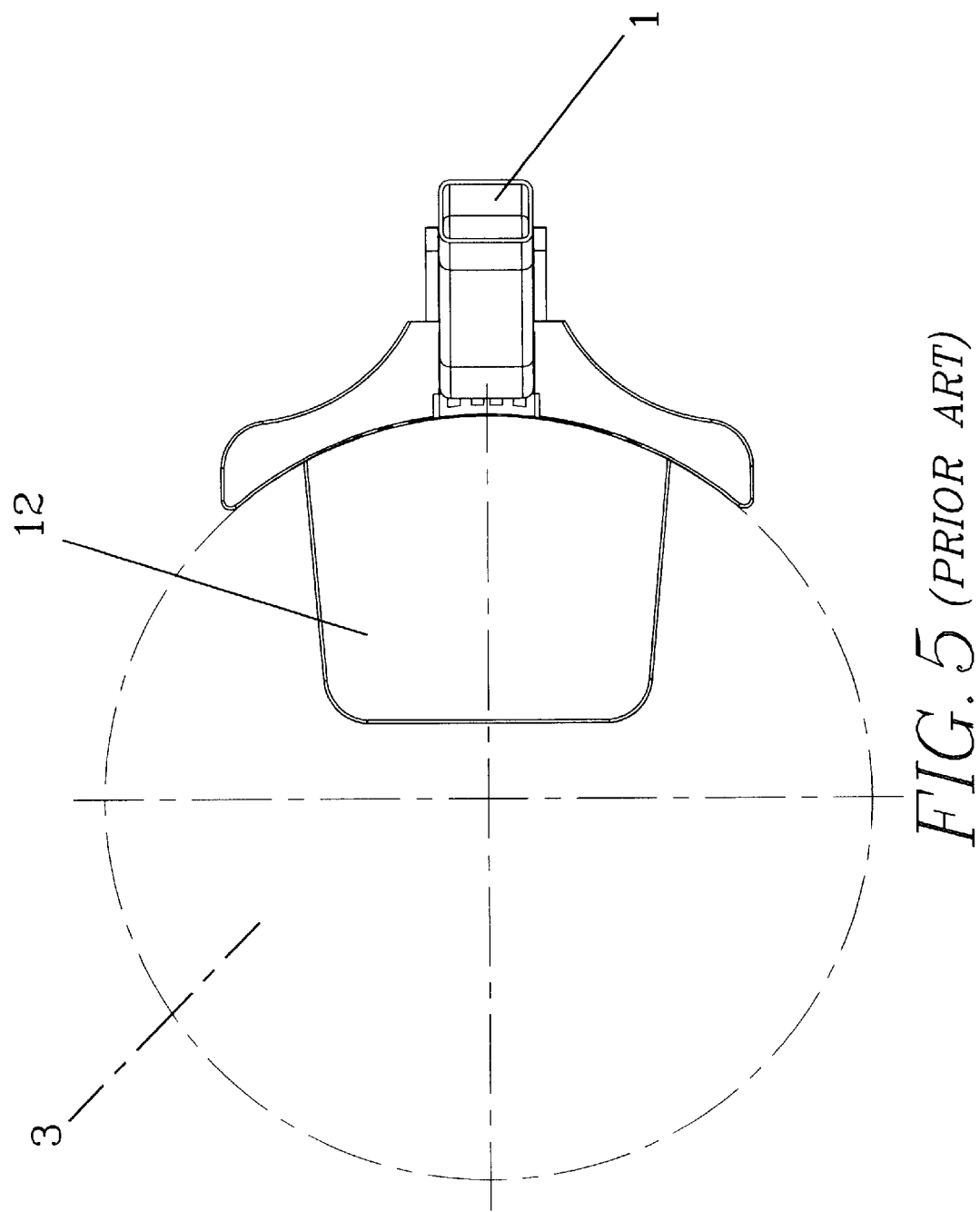
FIG. 5 is an upper view of the golf club bag placed on the known conventional golf cart.
Figure 10:
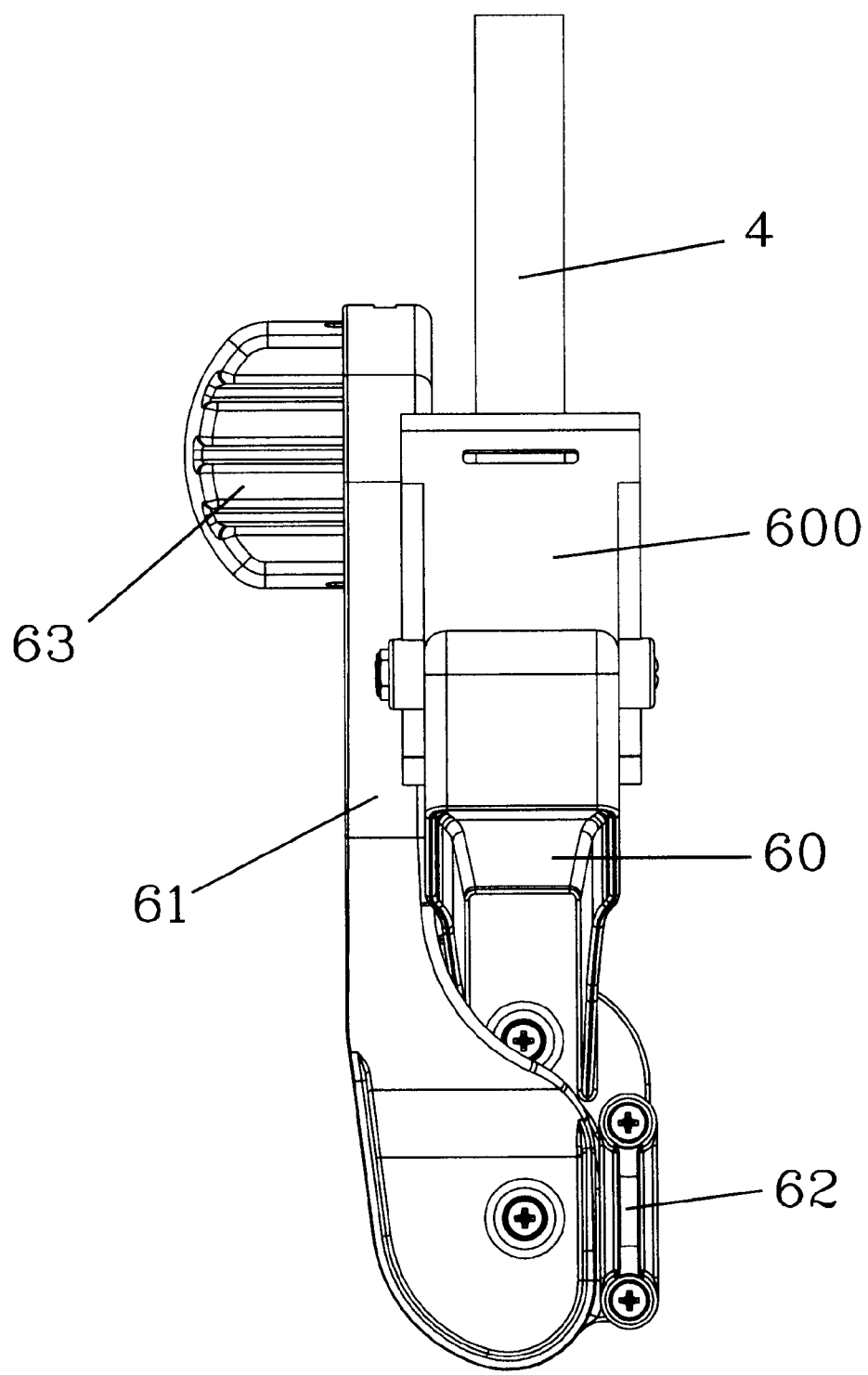
FIG. 10 is a side view of the lower supporter collapsed in the present invention: and, FIG. 11 is a collapsed side view of the golf cart using the lower supporter in the present invention.

From the point of practicability, the curved support member 10 of the conventional golf cart reduces support dimensions of the lower supporter 12 for the golf club bag 3, as shown in FIGS. 4 and 5. On the contrary, the frame rod 4 of the invention is straight, and the lower supporter 6 has a wide size for supporting the golf club bag 5, and consists of the upper support base 60 and the lower support base 61 interactive to each other, resulting in a minimized collapsed size, as shown in FIG. 10. And its collapsing action is quick and easy.

While the preferred embodiment of the invention has been described above, it will be recognized and understood that various modifications may be made therein and the appended claimed are intended to cover all such modifications that may fall within the spirit and scope of the invention.

I claim:

1. A lower supporter for a golf cart comprising:
    an upper support base having two opposing ends said upper support base having a pivot opening formed in an intermediate portion, said upper support base further having a pair of projecting blocks pivotally connected to said two opposing ends of said upper support base,
    a lower support base located under said upper support base, said lower support base having a pivot opening corresponding to said pivot opening of said upper support base,
    a pair of pivot arms provided at outer sides of said pivot openings of both said upper and said lower support bases, said pair of said pivot arms connecting said upper and said lower support bases so that said upper and said lower support bases move together between collapsed and extended positions, and
    a straight frame rod having a lower end that is connected to pivot pins received in said pivot openings of said upper support base and said lower support base; wherein
    said lower support base supports a bottom of a golf club bag, and said upper support base supports a side of said golf club bag, said projecting blocks pivotally connected to said upper support base pivoting about an axis parallel to said straight frame so that a lateral position of said projecting blocks is adjusted to accommodate golf bags of different sizes.

* * * * *

UNITED STATES PATENT AND TRADEMARK OFFICE
CERTIFICATE OF CORRECTION

PATENT NO.    : 6,364,327 B1
DATED         : April 2, 2002
INVENTOR(S)   : Liao

It is certified that error appears in the above-identified patent and that said Letters Patent is hereby corrected as shown below:

Title page,
Item [*], Notice, delete the phrase "by 0 days" and insert -- by 60 days --

Signed and Sealed this

Twenty-first Day of September, 2004

JON W. DUDAS
*Director of the United States Patent and Trademark Office*